Oct. 23, 1962 C. SHEER ET AL 3,060,109
BENEFICIATION OF ORES
Filed May 3, 1954
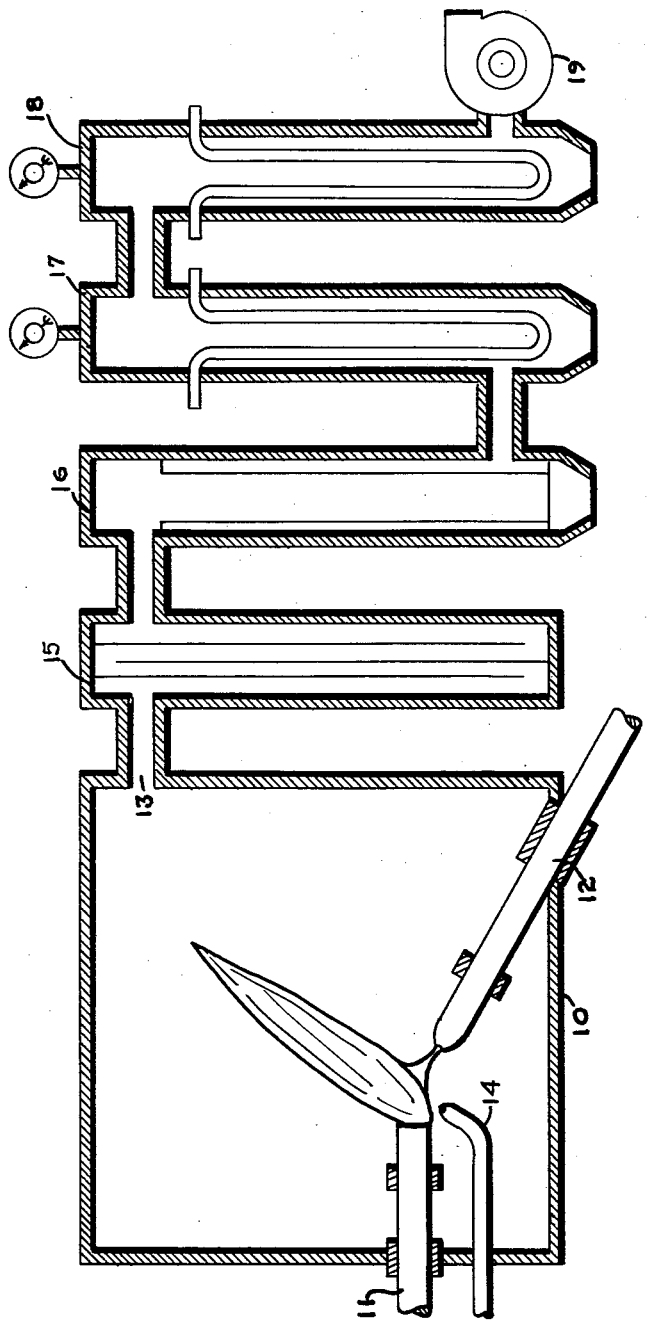
INVENTORS
CHARLES SHEER
SAMUEL KORMAN
BY

3,060,109
BENEFICIATION OF ORES
Charles Sheer, Teaneck, N.J., and Samuel Korman, Cedarhurst, N.Y., assignors to Sheer Korman Associates, Inc., New York, N.Y., a corporation of Delaware
Filed May 3, 1954, Ser. No. 427,044
1 Claim. (Cl. 204—164)

This invention relates to a process for the beneficiation of ores containing iron, nickel and cobalt.

There are many ores that are of such low-grade that they do not attract for use, because the separation of the values in them is accomplished only by the use of the complicated and involved hydrometallurgical procedures, such as leaching and re-cycling solutions, precipitation and smelting.

The capital investments in plant facilities are usually very large, and impose a high expense in the extraction equipment, so that the cost per pound of extracted metals becomes prohibitive, especially when low-grade ores are involved. The ores are usually sulfides, or oxides associated with quantities of inert groups. The extraction steps, by existing processes require careful adjustment of leach liquor composition, temperature, flow rates, and much handling of inert materials. Even the use of flotation concentrates does not avoid the difficulties and complexities of such process steps, since the association of metal sulfides, or oxides, prevent beneficiation beyond the point of maximum enrichment of values attributable to the ratio of valuable metal to worthless material to which the metal is chemically bound.

In the process of this invention the values of such ores can be readily separated by means of a high erosion arc. When an arc is maintained between two electrodes at a sufficient current density, a new phenomenon occurs in that the temperature adjacent to the anode face rises to a value much higher than the common arc, and there issues from the anode face a tail flame, or jet, comprising the vaporized material of the anode, moving at high speed.

It results that with such an arc it is possible to carry out, in vapor phase, reaction that would otherwise be practically impossible. The temperatures involved, moreover, running up to 10,000° C., are so high that the compound ores herein referred to are dissociated into elemental vapor form, and so can be transposed into separate compounds which are volatile at relatively low temperatures. Such compounds, therefore, can be easily separately condensed from the gas stream.

As a practical illustration of the carrying out of this process, we may consider its application to the treatment of an ore containing nickel, cobalt and iron. If such ore contains sulphur, it is desirable first to roast it in a conventional manner, to convert the metal values of the oxides. We may now fabricate an anode for an electric arc, composed of the oxides above referred to together with sufficient carbon to render the electrode conductive. This carbon will also serve as a reducing agent, in the reduction of oxides, and the amount of carbon in any particular case may desirably be more than that required to give conductivity. The percentage relative to the ore will normally be dependent on the nature of the ore to be treated, but in our work we have found from 15% to 30% the most desirable range, to secure the greatest efficiency of the process.

At the fringes of the visible region of the tail flame a rapid reduction of flame temperature occurs, and as the effluent gas loses heat it reaches a range of temperature in which the carbonyls of certain of the metals, e.g. iron and nickel may become stable compounds. Consequently, if this flame projects into an atmosphere of carbon monoxide the carbonyls of the constituent metals will be formed. The zone where this occurs may be enlarged by use of properly adjusted magnetic fields, and such controls of ambient atmospheric pressures of carbon monoxide, in order to bring the formation of the metal carbonyls to completion.

There compounds are characterized by two valuable features:

(1) They are relatively low temperature boiling liquids, which do not solidify until well below room temperature, e.g. iron pentacarbonyl melts at −21° C., and boils at 102.8° C.; nickel carbonyl melts at −25° C., and boils at 42° C., while cobalt carbonyl melts at 51° C. and decomposes at 52° C.

(2) The carbonyls, particularly of nickel and cobalt, are readily decomposed by heat and easily reduced to metal.

By combination of these properties advantage is taken of the fact that they can be readily made, by use of the high erosion arc, for reduction in the vapor state in the tail flame; and from them we can produce the carbonyls selectively, by operating in a properly adjusted carbon monoxide atmosphere. This makes possible a simple effective condensation of the metal values, away from each other, so that the products are immediately available in relatively pure form, for decomposition to metal in a simple heating step thereafter. The carbon monoxide obtained by decomposition of the pure carbonyl which have been formed may be returned to the process.

In accordance with this invention, therefore, we fabricate electrodes for the arc from a mixture of the pulverized composite ore, together with the carbon and then conduct a high erosion arc with such electrodes as anode. If D.C. is used, the cathode may be carbon, but if A.C. arc is used, all electrodes will contain the ore. The chamber surrounding the arc is filled, or highly charged with an atmosphere of carbon monoxide (CO).

The tail flame of such an arc contains the dissociated oxides which undergo rapid reduction in the gaseous vapor to form a vapor of metal atoms and carbon monoxide.

In the drawings there is diagrammatically shown an apparatus for the carrying out of the process, in which the numeral 10 indicates a refractory chamber having an anode 11 and a cathode 12 passing through its wall, in position to permit a high erosion arc to be formed between them. These electrodes are inclined toward each other as shown, to project the tail flame, which is characteristic of the high erosion arc, to extend toward the outlet 13 of the chamber.

The chamber 10 is filled with CO gas, or is highly charged with such gas at all times of operation, and to this end the CO is fed constantly to the chamber. As here shown, one or more nozzles 14 project into the chamber, which method permits a very thoro mixing of the incoming gas with the material comprising the tail flame. This facilitates both the cooling of the gases, it insures a very complete dispersion of the gases with each other. It will, of course, be understood that the carbon contained in the anode will, itself, play its part in the reduction of the ores, and in some instances this may prove sufficient as to make the extra jets 14 unnecessary.

The carbonyls resulting from the reactions in the chamber 10 as above described are carried from that chamber into a heat exchanger 15 where the temperature is brought to a point where the iron pentacarbonyl will be precipitated in liquid form, say at 80° C. This may be then passed into and separated out in a precipitator conventionally shown at 16. The unprecipitated portion may then be passed into a condenser 17 where the cobalt carbonyl may be precipitated at a temperature of 51° C. The remaining carbonyl, that of the nickel, may be carried into a precipitation in a precipitator 18 at a temperature of 30° C.

The temperatures recited are by no means fixed except that in each precipitation it must be kept at a temperature at which only one of the substances will condense out.

In the drawing there is illustrated a blower 19 as a conventional means of drawing the gases through the precipitators.

After the carbonyls have been separated, as above described, they may be readily broken down, or utilized in any conventional way.

The phrase "complex ores" is used to designate any ores which contain more than one of the group comprising iron, nickel, cobalt, chromium and tungsten.

What we claim:

The process of beneficiation of complex ores containing iron, nickel and cobalt which comprises vaporizing the ore in a high erosion arc to produce an atmosphere containing vaporized carbon and cooling the vapors thus formed in the presence of carbon monoxide, and then fractionally condensing out the metal carbonyls thus formed.

References Cited in the file of this patent

UNITED STATES PATENTS

| Number | Name | Date |
|---|---|---|
| 324,658 | Cowles et al. | Aug. 18, 1885 |
| 1,789,813 | Gaus | Jan. 20, 1931 |
| 1,825,241 | Mittasch et al. | Sept. 29, 1931 |
| 1,858,220 | Schlecht et al. | May 10, 1932 |
| 1,904,761 | Scott | Aug. 18, 1933 |
| 2,070,186 | Seil | Feb. 9, 1937 |
| 2,207,746 | Maier | July 16, 1940 |
| 2,242,115 | Danciger | May 13, 1941 |
| 2,265,180 | Maier | Dec. 9, 1941 |
| 2,378,053 | Wallis et al. | June 12, 1945 |
| 2,395,999 | Fill | Mar. 5, 1946 |
| 2,616,843 | Sheer et al. | Nov. 4, 1952 |
| 2,617,761 | Sheer et al. | Nov. 11, 1952 |
| 2,757,077 | Lewis | July 31, 1956 |

FOREIGN PATENTS

| Number | Country | Date |
|---|---|---|
| 553,820 | Germany | June 30, 1932 |